United States Patent
Metzler et al.

[11] 3,768,314
[45] Oct. 30, 1973

[54] MODULAR GAUGE HOUSING

[75] Inventors: Robert H. Metzler, Hanover Park; Jerome N. Zurek, Chicago, both of Ill.

[73] Assignee: Stewart-Warner Corporation, Chicago, Ill.

[22] Filed: Jan. 20, 1972

[21] Appl. No.: 219,456

[52] U.S. Cl.............................. 73/432 AD, 312/108
[51] Int. Cl...................... G01d 11/30, A47b 87/02
[58] Field of Search................. 73/432 AD; 248/27; 312/108

[56] References Cited
UNITED STATES PATENTS

| | | | |
|---|---|---|---|
| 3,570,108 | 3/1971 | Sarra | 73/431 |
| 1,040,780 | 10/1912 | Schubert | 73/431 |
| 3,040,698 | 6/1962 | Gray | 248/27 |
| 3,504,876 | 4/1970 | Swanson | 248/27 |
| 1,878,035 | 9/1932 | Vickery | 73/432 AD X |
| 3,276,599 | 10/1966 | Then | 248/27 |
| 3,065,942 | 11/1962 | Cameron | 248/27 |

Primary Examiner—Richard C. Queisser
Assistant Examiner—Daniel M. Yasich
Attorney—Augustus G. Douvas et al.

[57] ABSTRACT

The following specification describes front and rear annular housing sections forming a housing assembly for receiving a gauge with the bezel of the gauge held between the two sections, and the gauge dial viewed in the annular opening of the front section. A clip inserted in a wall passageway of two adjacent rear housing sections has spaced walls overlapping interior surfaces of the two housing sections to join together respective housing assemblies and form a cluster. A rear panel closes off the rear of the rear section to hide the interior of the assembly, and a mounting clip engaging a rear housing section passageway has a swivel support to enable the entire cluster to be carried at a desired angle from a support.

13 Claims, 13 Drawing Figures

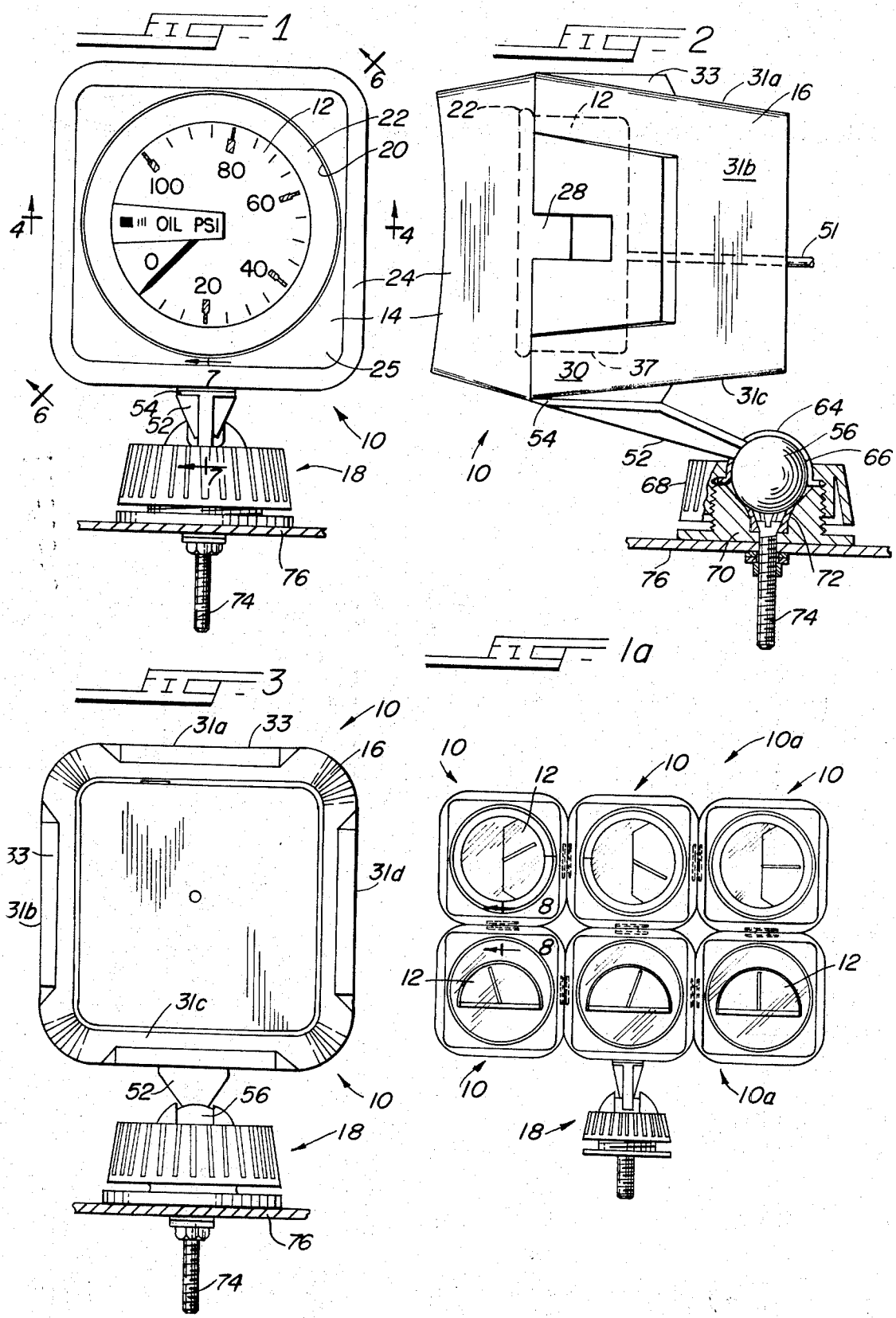

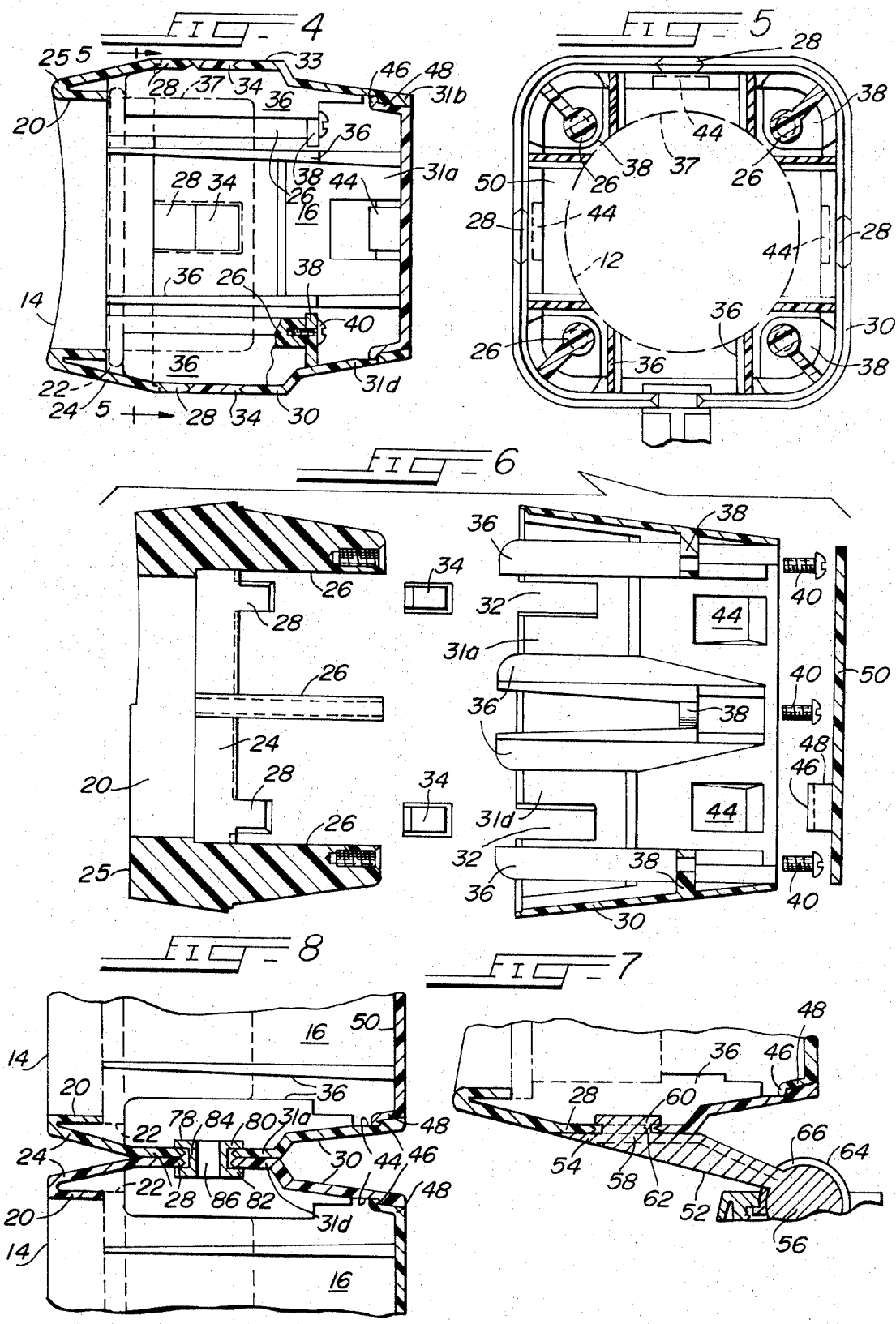

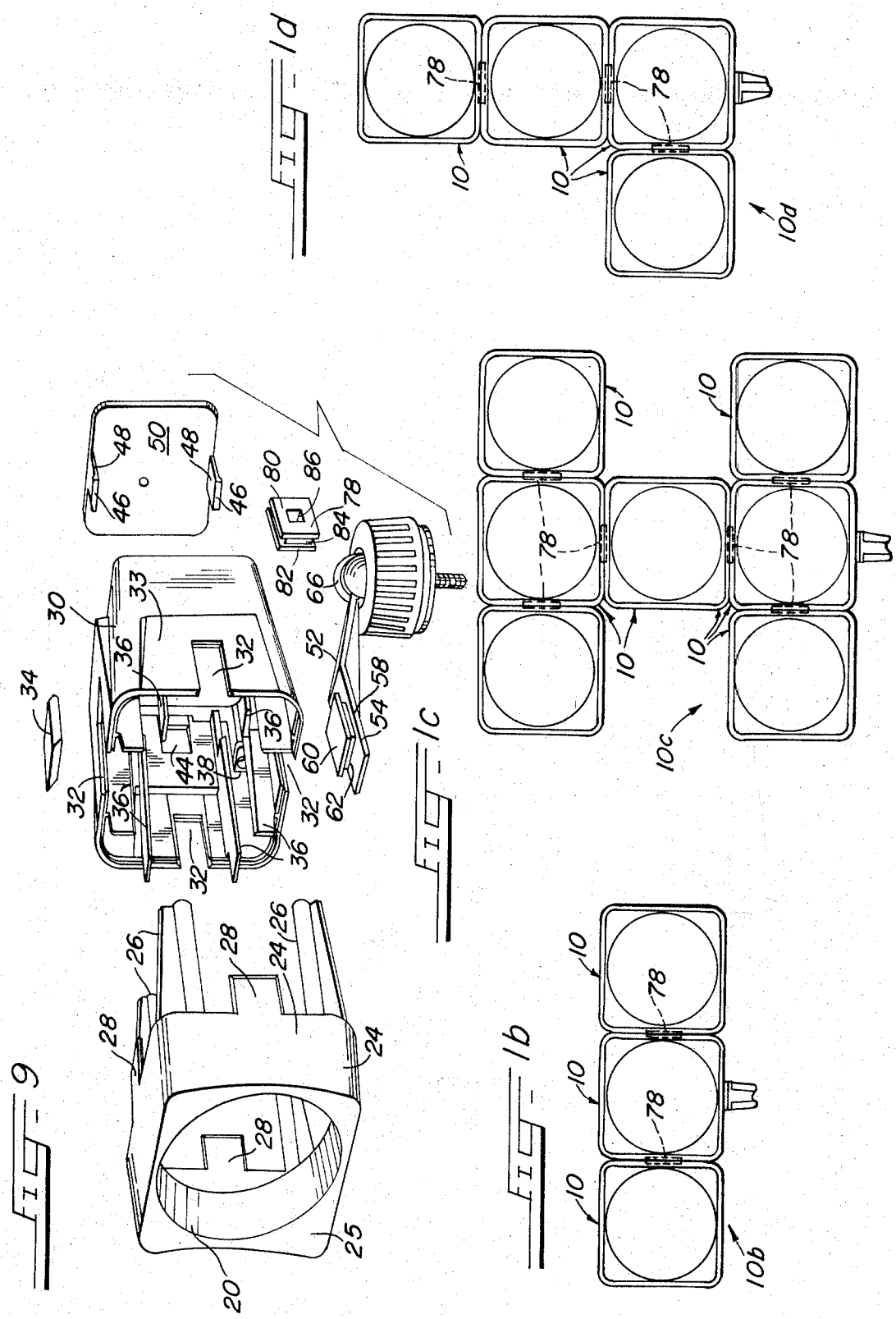

MODULAR GAUGE HOUSING

BACKGROUND OF THE INVENTION

1. Field of the Invention

This invention relates in general to gauge housings and more particularly to a more esthetic easily assembled economical gauge housing arrangement.

2. Brief Description of the Prior Art

It is a common practice when mounting additional gauges on a vehicle dashboard or the like to mount each gauge individually or alternatively to mount the gauges in a panel, which is then mounted on the dashboard. Both individual gauges and a panel are a nuisance to mount and are esthetically displeasing since each gauge housing presents a disparate appearance.

SUMMARY OF THE INVENTION

The present invention proposes to house each guage in a respective housing comprising nesting plastic front and rear sections having a snap fitted back for encircling each gauge. Openings or passageways on each side of the rear section are provided for receiving either a clip to support an adjacent housing and form a cluster, a panel to camouflage the opening or a mounting assembly to carry all of the housings from an appropriate support. In addition, the mounting assembly is provided with a ball and socket joint which permits the housings to be supported in a desired angular position in response to tightening of a nut in a ring against the ball.

Accordingly, it is a primary object of the present invention to provide an economical universal gauge housing providing an improved esthetic appearance for stacked gauges on a single support.

Other objects and features of the present invention will become apparent on examination of the following specification and claims together with the accompanying drawings.

BRIEF DESCRIPTION OF THE DRAWINGS

FIG. 1 is a front elevational view of a single gauge housing assembly incorporating the principles of the present invention, together with a mounting assembly;

FIG. 1a – 1d are each a front elevational view of a cluster or stack of housing assemblies incorporating the principles of the present invention with FIG. 1a illustrating respective gauge dials for each housing assembly;

FIG. 2 is a side elevational view of the housing assembly shown in FIG. 1 with a gauge shown partially in phantom and the mounting assembly in partial section;

FIG. 3 is a rear elevational view of the housing assembly shown in FIG. 1;

FIG. 4 is a sectional view of the housing assembly taken along the line 4—4 in FIG. 1;

FIG. 5 is a sectional view of the housing assembly taken generally along the line 5—5 in FIG. 4;

FIG. 6 is a sectional view of the housing assembly taken along the line 6—6 in FIG. 1;

FIG. 7 is a fragmentary sectional view taken gerally along the line 7—7 in FIG. 1 illustrating the mounting assembly and the connection to the housing assembly;

FIG. 8 is a partial sectional view taken generally along the line 8—8 in FIG. 1a to illustrate the connection between adjacent housing assemblies; and FIG. 9 is an exploded isometric view of a housing assembly forming a portion of a cluster.

DESCRIPTION OF THE PREFERRED EMBODIMENT

In FIGS. 1, 2 and 3 a housing assembly incorporating the principles of the present invention is indicated by the reference character 10. As shown in FIGS. 1a –1d, a series of housing assemblies 10 may be arranged in a variety of stacks or clusters indicated by respective characters 10a –10d with each ssembly 10 carrying a respective gauge such as 12, indicated by broken lines in FIGS. 2, 4 and 5 and solid lines in other Figures. Each housing assembly 10 comprises a pair of annular coaxial sections 14 and 16 for detachably carrying a respective gauge 12 therebetween and one assembly 10 is detachably carried by a base or mounting assembly 18.

The housing section 14 comprises an annular circular wall 20 defining a 2 3/16 inch opening through which the gauge dial and a portion of the gauge bezel 22 are seen. The bezel 22 is a conventional annular member or ring, which overlaps both the gauge lens or glass and a peripheral lip on one end of the gauge housing, for clamping the lens to the lip at the gauge housing end. The bezel has a diameter somewhat larger than 2 3/16 inch or about 2¼ inch. The wall 20, best seen in FIGS. 4, 6, 8 and 9, had an axial length of substantially one-half inch and is integrally interconnected with an annular four-sided wall 24 spaced radially outwardly of wall 20 by means of a radial wall 25 at the front ends of wall 20 and 24. Wall 24 extends axially for substantially 1 inch so as to project at the rear beyond wall 20, and each side slopes radially outwardly to provide substantially 2¾ inch between sides. Four elongate bosses 26, each located radially between the inner and outer walls 20 and 24, project rearwardly adjacent each corner of the outer wall 24 for substantially 1¼ inch past the rear end of wall 24 and each boss 26 has a threaded aperture at the projecting end. Four generally rectangular integrally formed tabs 28 project from the rear edge of the wall 24 intermediate the ends of each side.

The other section 16 has an annular wall 30 defined by four sides 31a–31d. The four sides of wall 30 correspond in dimension at the one end to the rear edge of the sides defining wall 24, and both walls 24 and 30 have dovetailing recessed mating edges for nested engagement with each other. Recesses or passageways 32 for receiving a respective tab 28 are provided in a short straight or flat portion 33 of each side 31a–31d of wall 30 and located intermediate the ends of each side for facilitating assembly of a cluster. The recesses 32 are of the same width as the tabs 28, but are twice the length to receive a small panel section 34 of the same width and length as the tabs 28 between the recess end and the tab. The edges of recesses 32 are recessed to provide guideways for bevelled edges of the tabs 28 and panels 34. Any one of the four sides of wall 30 may therefore be aligned with any one of the four sides of wall 24.

A pair of radially inwardly projecting axially extending fins 36 are formed on the inner surface of wall 30 along each side 31a–31d. One fin on each side is located adjacent opposite corners of the side to provide a pair of fins 36 sandwiching respective corners of wall 30. Each pair of fins 36 adjacent a respective corner receives a respective projection boss 26 of section 12 therebetween. A radially inwardly projecting flange 38 is provided in each corner of wall 30 at an axial position adjacent the end of boss 26 substantially 1¼ inch from the front end of section 16 when the two walls 20 and 30 are engaged with each boss 26 between a respective pair of fins 36. A screw 40 seen in FIGS. 4 and 6, passing through the respective flange and threaded into the apertured end of a respective boss secures the two walls 20 and 30 together.

The radially inner edge of each fin 36 is bevelled for nestingly receiving the rim wall of the conventional cup-shaped housing indicated by broken lines 37 of a gauge 12 and the fins are tapered in cross section towards the rear of wall 30 to provide a thicker cross section in that direction. The cylindrical wall of housing 37 has a nominal diameter of 2 1/32 inch to 2 1/16 inch and the radially inward surfaces of fins 36 define a corresponding diameter. Each fin 36 projects slightly forwardly of section 16 into section 14 for abutment with the rear edge of gauge bezel 22, which has its forward edge in abutment with the rear edge of wall 20 whereby the bezel 22 of the gauge 12 is nestingly received between the fins 36 and the rear edge of wall 20. A gasket may be provided behind bezel 22 if the bezel is too thin to completely occupy the space between fins 36 and wall 20 when sections 14 and 16 are engaged.

A recess 44 is also provided adjacent the rear edge of the annular section 16 intermediate the ends of each side 31a–31d. Each recess 44 is adapted to receive a radially outwardly extending lip 46 on a respective one of a pair of spring tabs 48 integrally formed on a rear closing plastic panel 50. The closure element or panel 50 is four-sided and dimensioned to correspond to the rear opening of section 16 for nested engagement therein with the lips 46 received in a selected pair of the recesses 44 located in opposite sides of section 16. Thus, the edges of panel 50 may be aligned with any of the sides 31a–31d. Appropriate openings are formed in panel 50 for receiving electrical leads such as 51 seen in FIG. 2, which may be used to operate the gauge or light the same and, in the case of an oil gauge such as indicated in FIG. 1, a pressure line or other type of sense transmission apparatus is extended through the rear panel 50. It will be appreciated that the length of section 16 is substantially 2¼ inch, which is sufficient to accommodate the conventional studs and electrical sockets usually provided on the back wall of the gauge 12 and still permit the engagement of panel 50 with section 16.

The base assembly 18 is utilized to mount the housing assembly or cluster of housing assemblies such as shown in FIGS. 1a-1d from a suitable support. To provide this function the base assembly comprises an elongate angular projecting arm 52 having a clip portion 54 at one end and a ball 56 at the other end.

The clip portion 54 comprises a pair of spaced walls 58 and 60, as best seen in FIGS. 7 and 9, spaced by an interconnecting wall 62 having dimensions corresponding to the width of passageway 32 and the length of passageway 32 less the length of tab 28. The wall 62 is received in recess 32 in place of panel 34 with walls 58 and 60 overlappingly engaged with the adjacent wall of section 16 to thereby secure the arm 52 to the housing assembly 10.

The ball 56 is received in a spherically shaped shell 64 having an inner diameter corresponding to the ball and extending for somewhat more than 180°. The arm 52 extends through a passageway or slot 66 seen in FIGS. 2 and 7 in the shell 64 and the slot enables almost 180° movement of the arm 52 along the elongate axis of the slot. The shell 64 has a peripheral flange seated against the back wall of a cup-shaped knurled ring 68 having internal threads for engaging a nut 70, and the shell 64 together with arm 52 are rotatably 360° about the axis of ring 68.

The nut 70 has a central ball-shaped cavity in which a crenated dish-shaped washer 72 is seated for grasping the ball 56 to lock the arm 52 and housing assembly 10 into position in response to tightening of the nut 70 relative ring 68. A stud 74 having a head seated in the washer 72 in the nut cavity extends through the washer and a central opening in the ring for securing the housing assembly 10 to an appropriate support 76. The stud 74 is coaxial with the ring 68 and nut 70 enabling ring 68 to be loosened relative the nut for adjusting the angular position of arm 52 and then tightened without disengaging stud 74 from support 76.

The housing assembly 10 in turn may support one or more additional housing assemblies as, for example, shown by the gauge clusters 10a–10d in FIG. 1a–1d respectively. In these clusters the housing assemblies substantially the same shape and size are optionally stacked in side-by-side or layered relationship with the gauges 12, as shown in FIG. 1a, arranged in any desired angular position. To provide any one of the clusters 10a–10d, the panel sections 34 in adjacent sides of sections 16 are omitted and instead a clip 78, identified in FIGS. 1a – 1d, 8 and 9 is used. The clip 78, as best seen in FIGS. 8 and 9, is constructed similarly to the clip portion 54 of the base assembly and comprises two walls 80 and 82 spaced apart by a wall 84 having a height corresponding to the thickness of the two adjacent side walls of section 16 and a length and width corresponding to panel 28 for engagement in the corresponding portion of passageway 32. Walls 80 and 82 of the clip 78 are located in overlapping engagement with the interior surface of the walls 31b and 31d, for example, of the flat portion 33 of two adjacent housings to prevent housing separation. A central opening or passageway 86 in each clip 78 permits electrical leads or other sensing apparatus to be threaded from one housing assembly through respective housing assemblies to a desired gauge and thereby camouflage the leads.

Briefly, the housing assemblies 10 and gauges 12 are assembled by placing the wall 37 of gauges 12 in the housing annular section 16. Leads or other sense transmission lines are extended through a respective panel 50 and appropriately connected or secured to the respective gauge, usually prior to the insertion of gauges 12 to section 16. A clip 78 is inserted in each passageway 32 which is located in a side 31a–31d, for example, engaged by a side of another housing assembly with the clip wall 84 extending through the passageways of the two adjacent sides. The clip portion 54 of arm 56 is inserted in one passageway 32 of a selected section 16 and a panel 34 inserted in each passageway 32 that does not receive either a clip 78 or clip portion 54. It will be noted that the clip portion 54 can be inserted into passageway 32 so that arm 56 projects in any one of four directions permitting a wide variety of suspension for the housing. Where desired, leads are drawn through openings 86 in the clip 78 and secured to respective gauges. Tabs 28 of front section 14 are aligned with respective passageways 32 and the front section 14 are aligned with respective passageways 32 and the front section 14 assembled to the rear section 16 with the bosses 26 located between respective pairs of fins 36. The gauges are adjusted to a desired angular position either before or after assembly of the front section of the rear section to assume respective positions as shown in FIGS. 1 or 1a. The screws 40 are then inserted through flanges 38 and threaded into bosses 26 to secure the sections 14 and 16 together with the bezel 22 nested securely between wall 20 and the ends of fins 36 and the gauge housing wall 37 nested by the radially inward edge of fins 36. The back panels 50 are then engaged by simply pressing the spring tabs 48 radially inwardly until they engage inside of section 16 and move forward until lips 46 engage respective recesses 44 to secure the back or rear panel 50 in position.

To mount the cluster, the stud 74 of the base assembly 18 extending through the washer 72 and nut 70 is inserted through an appropriate support opening and secures the nut and washer, or an appropriately headed sheet metal screw is used in place of stud 74. The ring 68 is threaded into the nut 70 and the ball 56 and arm 52 are both rotated in slot 66 and about the ring axis until the housing assembly or cluster is in a desired angular position. The ring 68 is then tightened in the nut 70 to clamp the ball 56 and arm 52 in the desired position. If the nut 70 is mounted on a perpendicular wall, the arm 56 is rotated to the lowest position in the shell slot 66 before the ring 68 is tightened. It will be appreciated that a wide variety of gauges such as ammeters, voltmeters, temperature and pressure gauges are thus accommodated to provide a uniform external appearance.

Thus foregoing constitutes a description of an improved housing assembly adapted to be arranged in a cluster and whose inventive concepts are believed set forth both by the preceding description and the accompanying claims.

What is claimed is:

1. A housing assembly for carrying a gauge including a cylindrical wall for said gauge, said gauge having a bezel at one end of said gauge cylindrical wall with said bezel being of larger diameter than the diameter of said cylindrical wall, the improvement comprising a first annular section having a pair of spaced integrally formed annular walls with one of said spaced integrally formed annular walls abutting the front face of said bezel and the other integrally formed annular wall overlapping the bezel, a second annular section having one annular wall in peripheral engagement at one axial end with one axial end of said first section other overlapping wall, axially extending fin means integrally formed on said second annular section with said axially extending fin means having one axial end abutting the rear face of said bezel for sandwiching said bezel between said axially extending fin means and said abutting first section one annular wall, said axially extending fin means extending radially inwardly of said second annular section at spaced angular positions for engaging said gauge cylindrical wall to support said cylindrical wall coaxially of said first section one annular wall, means integrally formed on said first section and axially projecting from said first section at spaced angular positions for receipt thereof in said second section at angular positions intermediate the angular positions of said second section axially extending fin means, flange means integrally formed on said second section located within the peripheral boundary of said second section annular wall at angular positions displaced from the angular positions of said axially extending fin means and aligned with said first section axially projecting means, and means formed in said aligned flange means and said first section axially projecting means for enabling said flange means to be secured to said first section axially projecting means to enable said first section to be secured to said second section.

2. A housing assembly for carrying a gauge including a cylindrical wall for said gauge, said gauge having a bezel at one end of said gauge cylindrical wall with said bezel being of larger diameter than the diameter of said cylindrical wall, the improvement comprising a first annular section having a pair of spaced integrally formed annular walls with one of said spaced integrally formed annular walls abutting the front face of said bezel with the other integrally formed annular wall overlapping the bezel, a second annular section having one annular wall in peripheral engagement at one axial end with one axial end of said first section other overlapping wall, a plurality of pairs of spaced radially inwardly projecting fins integrally formed on said second annular section for sandwiching said bezel between one axial end of said fins and said abutting first section one annular wall and for engaging said gauge cylindrical wall to support said cylindrical wall coaxially of said first section one annular wall, a plurality of circumferentially spaced bosses integrally formed on said first section extending axially rearwardly from said first section at a radial position intermediate said first section one and other annular walls with each boss angularly positioned for receipt in a mating portion of said second annular section and between a respective pair of spaced radially inwardly projecting fins within the peripheral boundary of said second section annular wall, a plurality of integrally formed apertured radial flanges in said respective second section each angularly positioned intermediate a respective pair of fins for alignment with a respective boss received between the respective pair of fins, and a threaded member extending through each apertured flange and threaded into a respective boss for detachably securing said second section to said first section.

3. In the housing assembly claimed in claim 2, a plurality of circumferentially spaced passageways having grooved edges in said second section one annular wall initiated at said one end and extending to another position intermediate the axial ends of said second section, a tab for each passageway extending from said one end of said first section other wall into the respective passageway, and a panel inserted in any one of said passageways between the grooved edges and located between the respective tab and said passageway other position.

4. In the housing assembly claimed in claim 3, a mounting assembly including an arm having at one end a pair of spaced walls and an interconnecting wall with said interconnecting wall dimensioned for insertion into one of said passageways between the respective tab and said position with said spaced walls overlapping the interior and exterior surfaces of said second section annular wall for preventing radial movement of said wall relative said arm.

5. The housing assembly claimed in claim 4 in which said arm projects transversely relative the axis of said interconnecting wall and said interconnecting wall is dimensioned for insertion into said passageway with said arm projecting in any one of four directions from the axis of said interconnecting wall.

6. The housing assembly claimed in claim 4 in which the other end of said arm has a ball formed thereon engaging in a spherically shaped shell with said arm passing through a slot in said ball, and means for enabling said ball and said arm to be rotated to a desired angular position and clamped in said position.

7. The housing assembly claimed in claim 6 in which said means enabling said rotation and clamping comprises a threaded ring encircling said shell, a nut threaded on said ring and a crenalated washer sandwiched between said nut and ball in response to said threading for clamping said ball and shell against said ring.

8. In the housing assembly claimed in claim 7 a stud extending through said washer and nut for securing said mounting assembly to a support with said stud located along the axis of rotation of said nut to enable said nut to be threaded while said stud is secured to said support.

9. In the housing assembly claimed in claim 3, a clip comprising a pair of spaced walls and an interconnecting wall integrally formed intermediate said pair of spaced walls, said interconnecting wall dimensioned for receipt into the passageways of a pair of adjacent second annular sections for location between the respective tab and each receiving passageway other position, said clip spaced walls spaced for overlapping engagement with the respective interior surface of said pair of adjacent second annular sections to prevent movement of said pair of second sections relative each other along an axis extending between said clip spaced walls and the movement of said clip from said pair of receiving passageways is prevented in response to the securing of a respective first section to each of said pair of adjacent second annular sections whereby a plurality of said housing assemblies are adapted to be secured to each other.

10. In the housing assembly claimed in claim 9, a passageway in said clip interconnecting wall for enabling communication of an electrical lead between said pair of adjacent second sections.

11. A cluster of adjacent housing assemblies each carrying a gauge including a cylindrical wall for each gauge having a bezel at one end of larger diameter than the diameter of said gauge cylindrical wall, each housing assembly comprising a first annular section having a pair of spaced integrally formed annular walls with one of said walls abutting the front face of the bezel with the other annular wall overlapping the bezel of the respective gauge, a second annular section for each assembly having one annular wall with spaced integral axial ends in peripheral engagement at one axial end with one axial end of the other overlapping wall of the respective assembly first annular section, means integrally formed in each said second annular section of the housing assemblies for sandwiching the respective bezel between said means and the respective assembly abutting first section one annular wall and for engaging the cylindrical wall of the respective gauge to support said cylindrical wall coaxially of the respective first section one annular wall, axially projecting means integrally formed on each first section projecting into the second section of the respective assembly at angularly spaced positions, radially inwardly extending flange means integrally formed in each second section at angularly spaced positions aligned with said projecting means formed on the first section of the respective assembly, respective means for each flange means and projecting means of each assembly extending through the respective flange means to engage the respective projecting means and located within the peripheral boundary for each said second section annular wall for detachably securing the first section of a respective assembly to the second section of the respective assembly, a plurality of circumferentially spaced passageways in each said second section one annular wall initiated at said one axial end and extending to another position spaced from the other axial end of the respective second section, and a clip having an interconnecting wall inserted in any one of said passageways of one said second section of one assembly and a passageway in a second section of another assembly with said clip having spaced walls at opposite ends of said interconnecting wall engaging the interior surface of said one second section and the other assembly annular second section to prevent movement of said one second section and other assembly second section in a direction transverse to the axes of said one second section and other assembly second section and the movement of said clip interconnecting wall from said passageway is prevented by securing of a respective first section to said one second section and to said other assembly second section whereby said housing assemblies are adapted to be secured to each other.

12. In the cluster claimed in claim 11, a passageway in said clip for enabling the extension of an electrical lead from the interior of one second section to the interior of another second section.

13. In the cluster claimed in claim 12, other clip means inserted into any one of said passageways with said other clip means having a pair of spaced walls in overlapping engagement with the interior and exterior surface of the respective second section to prevent movement by said other clip means relative said second section in a direction transverse to the axis of said respective second section, and means secured to said clip means for controlling the angle at which said second section is carried by a support whereby said housing assemblies are adapted to be carried by said support at said angle in response to the securing of a respective first section to said respective second section for preventing movement of said other clip means from the respective second section passageway.

* * * * *